(12) United States Patent
Hayakawa et al.

(10) Patent No.: US 7,009,815 B2
(45) Date of Patent: Mar. 7, 2006

(54) DISK DRIVE WITH SPRING PROVIDED IN GROOVE OF VOICE COIL HOLDER TO ELECTRICALLY CONNECT VOICE COIL WITH FLEXIBLE PRINTED CIRCUIT

(75) Inventors: Takako Hayakawa, Hiratsuka (JP); Shigeo Nakamura, Odawara (JP); Kouki Uefune, Odawara (JP); Yuji Fujita, Yokohama (JP)

(73) Assignee: Hitachi Global Storage Technologies Japan, Ltd., Kanagawa-ken (JP)

( * ) Notice: Subject to any disclaimer, the term of this patent is extended or adjusted under 35 U.S.C. 154(b) by 250 days.

(21) Appl. No.: 10/387,381

(22) Filed: Mar. 14, 2003

(65) Prior Publication Data

US 2003/0189796 A1   Oct. 9, 2003

(30) Foreign Application Priority Data

Apr. 4, 2002   (JP) .............................. 2002-102615

(51) Int. Cl.
  *G11B 5/55*   (2006.01)
  *G11B 5/48*   (2006.01)
  *G11B 21/08*   (2006.01)
  *G11B 21/16*   (2006.01)

(52) U.S. Cl. ................. 360/264.2; 360/264.7; 360/265.8; 360/245.9

(58) Field of Classification Search ............ 360/264.2, 360/265, 264.7, 265.8, 266.3, 245.8, 245.9, 360/246

See application file for complete search history.

(56) References Cited

U.S. PATENT DOCUMENTS

| 6,399,889 B1 * | 6/2002 | Korkowski et al. ......... 174/255 |
| 6,487,053 B1 * | 11/2002 | Matsumura et al. ..... 360/265.7 |
| 6,556,387 B1 * | 4/2003 | Misso et al. ............. 360/265.6 |
| 6,724,578 B1 * | 4/2004 | Watanabe ................ 360/264.2 |
| 6,865,058 B1 * | 3/2005 | Kube et al. .............. 360/245.8 |
| 2002/0021532 A1 * | 2/2002 | Lee et al. ................ 360/265.9 |

FOREIGN PATENT DOCUMENTS

JP   9-180426   7/1997

* cited by examiner

*Primary Examiner*—Craig A. Renner

(74) *Attorney, Agent, or Firm*—Mattingly, Stanger, Malur & Brundidge, P.C.

(57) ABSTRACT

A technique of connection between VCM system wires and a FPC of a disk drive is improved in the following manner to enable miniaturization and thinning of the disk drive and reduction in cost. There is provided a disk drive comprising a disk-shaped medium for recording information, an actuator on which a head for recording/reproducing information is mounted, a VCM for driving the actuator, a coil holder supporting a coil of the VCM, a FPC for transmitting a signal, which is read by the head, and a signal to the VCM, a cut groove formed on a side of the coil holder, ends of coil lead wires and an end of a ground wire, which are arranged in the cut groove, and an end of the FPC inserted into the cut groove to thereby be connected to the ends of the coil lead wires and the end of ground wire.

6 Claims, 9 Drawing Sheets

DISK DRIVE WITH SPRING PROVIDED IN GROOVE OF VOICE COIL HOLDER TO ELECTRICALLY CONNECT VOICE COIL WITH FLEXIBLE PRINTED CIRCUIT

CROSS-REFERENCES TO RELATED APPLICATIONS

This application is related to and claims priority from Japanese Patent Application No. 2002-102615, filed Apr. 4, 2002. The entire disclosures of this application is incorporated herein by reference.

BACKGROUND OF THE INVENTION

There is a magnetic disk drive, which is smaller and thinner than 2.5-type or 3.5-type magnetic disk drives used in current personal computers and uses a small-diameter magnetic recording medium as described in JP-A-09-180426.

Portable small-sized magnetic disk drives are made further thinner than the 2.5-type magnetic disk drives. While, for example, the 2.5-type magnetic disk drives have a thickness of 9.5 mm, the thin portable small-sized magnetic disk drives have a thickness of around 5 mm.

FIGS. 4 and 5 show a configuration, in which Voice Coil Motor (hereinafter, referred as VCM) system wires (a coil lead wire and a ground wire) and a Flexible Printed Circuit (hereinafter, referred as FPC) are connected to each other in general magnetic disk drives. Referring to these enlarged views, a FPC ground wire connection portion 303, which is an extension of a FPC 301, is mechanically fixed to a coil holder 300 by a screw 305. The screw 305 is electrically conductive. The screw 305 puts the FPC ground wire connection portion 303 of the FPC 301 between it and the coil holder 300. Thereby, electric connection is made to the FPC ground wire connection portion 303 and the FPC 301 from the coil holder 300 through the screw 305. The reason why the coil holder 300 is connected with ground through the screw 305 and the FPC 301 is to ground (earth) a magnetic head. That is, a magnetic disk, which is connected through a spindle motor with ground, and the magnetic head are put at the same potential whereby the magnetic head is prevented from being electrostatically broken by static electricity generated between the magnetic head and the magnetic disk.

A lead wire extended from a coil 302 is soldered to a FPC connection portion 304, which is an extension of the FPC 301, on an upper surface of the coil holder. Also, in that construction, in which the coil holder 300 is molded from a resin material and the coil 302 is molded to be connected to the coil holder, the lead wire extended from the coil 302 is soldered to the FPC on the upper surface of the coil holder 300.

When the FPC is fixed to the coil holder by a screw to be connected with ground, a thickness corresponding to a screw head is required, which makes it difficult to make a magnetic disk drive smaller and thinner so as to adapt the drive to a portable.

As the magnetic disk drive becomes thinner, it becomes difficult to ensure a sufficient space between the coil holder and a yoke 407 (FIG. 6) of a VCM arranged in opposition to the coil holder. Therefore, the provision of a screw on the coil holder becomes further difficult from a point of view in ensuring a space. Further, accompanying with small sizing of a magnetic disk drive, size of a coil holder itself becomes smaller, whereby it also becomes difficult to ensure that magnitude of a tapped hole, which corresponds to a screw dimension for fixation of the FPC, on the coil holder. Also, it becomes difficult to ensure a space, in which a coil lead wire is soldered on the upper surface of the coil holder.

Also, in the case where a screw is correspondingly made smaller and thinner in size as a drive is made smaller and thinner in size, screw threads must be made small in pitch and height in working of threads. Therefore, working of a screw itself and working of thread grooves cannot be easily done. Further, as a screw becomes smaller, a head of the screw must be made smaller. Then, workability in assembling is worsened to have an adverse influence in terms of cost.

In other words, as a magnetic disk drive is made smaller and thinner in size, a screw cannot but be made correspondingly smaller and thinner in size. When a certain limit is exceeded, however, corresponding small-sizing and thinning of a screw reach limits in terms of strength and structure, so that a screw cannot be put into practical use. Also, magnetic disk drives are constructed such that a VCM yoke covers that upper surface of a coil holder, on which a screw is mounted. Therefore, as magnetic disk drives are made smaller and thinner in size, there is caused a situation, in which a portion accommodating a location for mounting a screw must be removed from the yoke in order to mount of the screw.

Instead of fixing a coil holder and a FPC ground wire connection portion together by means of a screw, there is a method in which a pin is press-fitted into a coil holder and the pin and a FPC connection portion are soldered together. Since a press-fit pin is smaller than a screw, such method appears to be suitable for miniaturization. In the case of adopting such method, however, there is a need for two steps, that is, a step of press-fitting of a pin and a step of soldering connection, in place of one step of screw fastening, by which workability in assembling is worsened.

SUMMARY OF THE INVENTION

It has been demanded that a magnetic disk drive be provided, in which it can be made small and thin in size and reduced in cost by solving the above problems and improving a technique of connection between VCM system wires and a FPC.

In order to solve the above problems, the following construction is mainly provided.

According to a first aspect of the present invention, there is provided a disk drive comprises: a disk-shaped medium for recording and reproducing information; an actuator on which a head for recording and reproducing information is mounted; a voice coil motor (VCM) for driving the actuator; a coil holder for holding a coil of the VCM; a flexible printed circuit (FPC) for transmitting a signal, which is given to and received from the head, and a signal to the VCM; and a connection portion for connecting ends of lead wires of the coil and an end of the FPC in a range of a thickness dimension of the coil holder.

According to a second aspect of the present invention, there is provided a disk drive comprises: a disk-shaped medium for recording and reproducing information; an actuator on which a head for recording and reproducing information is mounted; a voice coil motor (VCM) for driving the actuator; a coil holder for holding a coil of the VCM; a flexible printed circuit (FPC) for transmitting a signal, which is given to and received from the head, and a signal to the VCM; a cut groove formed on a side of the coil holder; ends of coil lead wires inserted into the cut groove;

and an end of the FPC being inserted into the cut groove to thereby be connected to the ends of the lead wires.

According to a third aspect of the present invention, there is provided a disk drive comprises: a disk-shaped medium for recording and reproducing information; an actuator on which a head for recording and reproducing information is mounted; a voice coil motor (VCM) for driving the actuator; a coil holder for holding a coil of the VCM; a flexible printed circuit (FPC) for transmitting a signal, which is given to and received from the head, and a signal to the VCM; a recessed portion formed on the coil holder; a connection substrate provided in the recessed portion for connection with ends of lead wires of the coil; and an end of the FPC being inserted into the recessed portion to thereby be connected to the ends of the lead wires on the connection substrate.

With such constitution, thinning (for example, a thickness of less than around 5 mm) of a magnetic disk drive can be achieved. Also, without the need of any specific parts for connection with a FPC, connection with a ground wire and a coil lead wire can be realized and contact at a connection point of the FPC can be made sure.

Other objects, features and advantages of the invention will become apparent from the following description of the embodiments of the invention taken in conjunction with the accompanying drawings.

DESCRIPTION OF PREFERRED EMBODIMENTS

Figure 1:
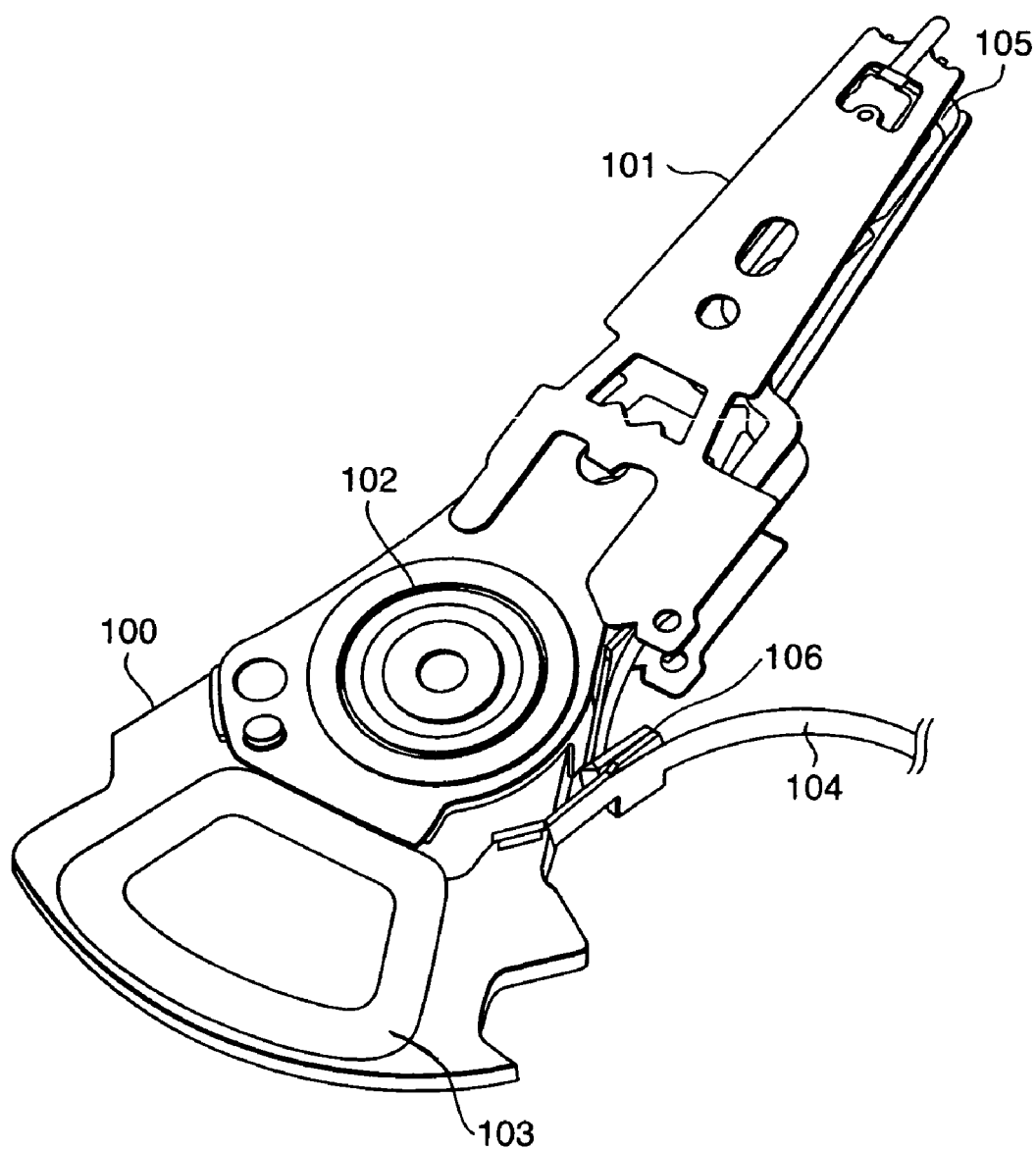
FIG. 1 is a perspective view of a whole construction of an actuator of a first embodiment of a magnetic disk drive according to the present invention.
Figure 2:
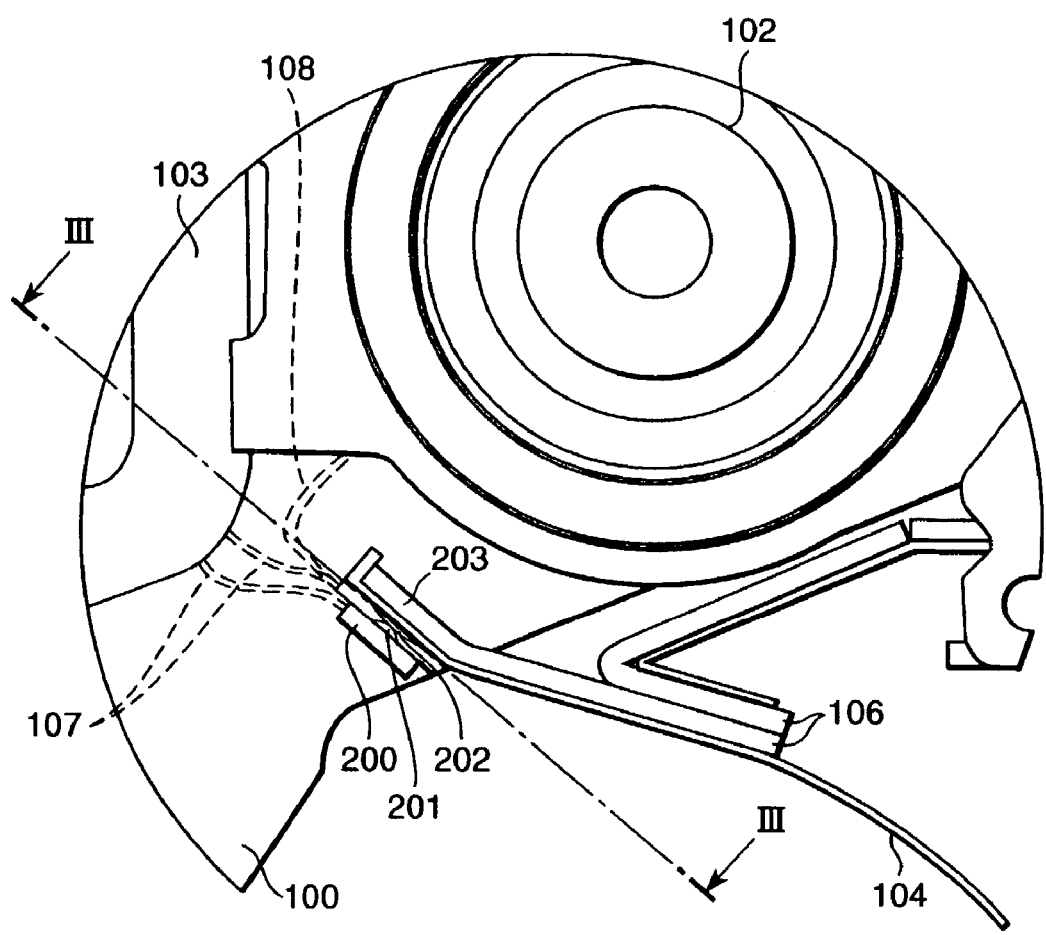
FIG. 2 is a view showing a detailed construction of a configuration of connection between VCM system wires (coil lead wires and a ground wire) and a FPC, in the first embodiment.
Figure 3:
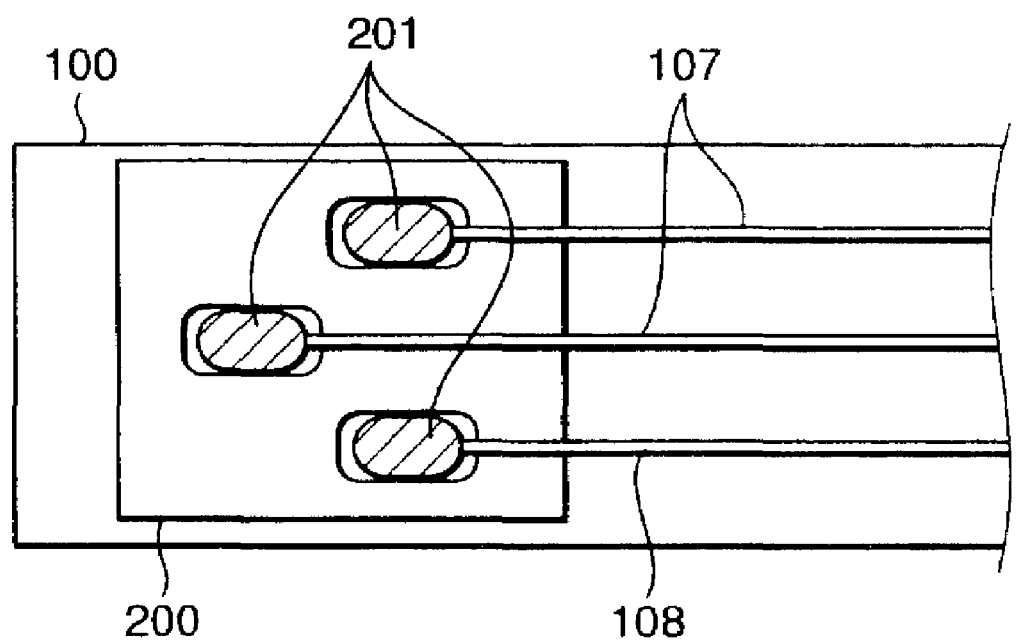
FIG. 3 is a sectional view taken along a line III—III in FIG. 2.
Figure 6:
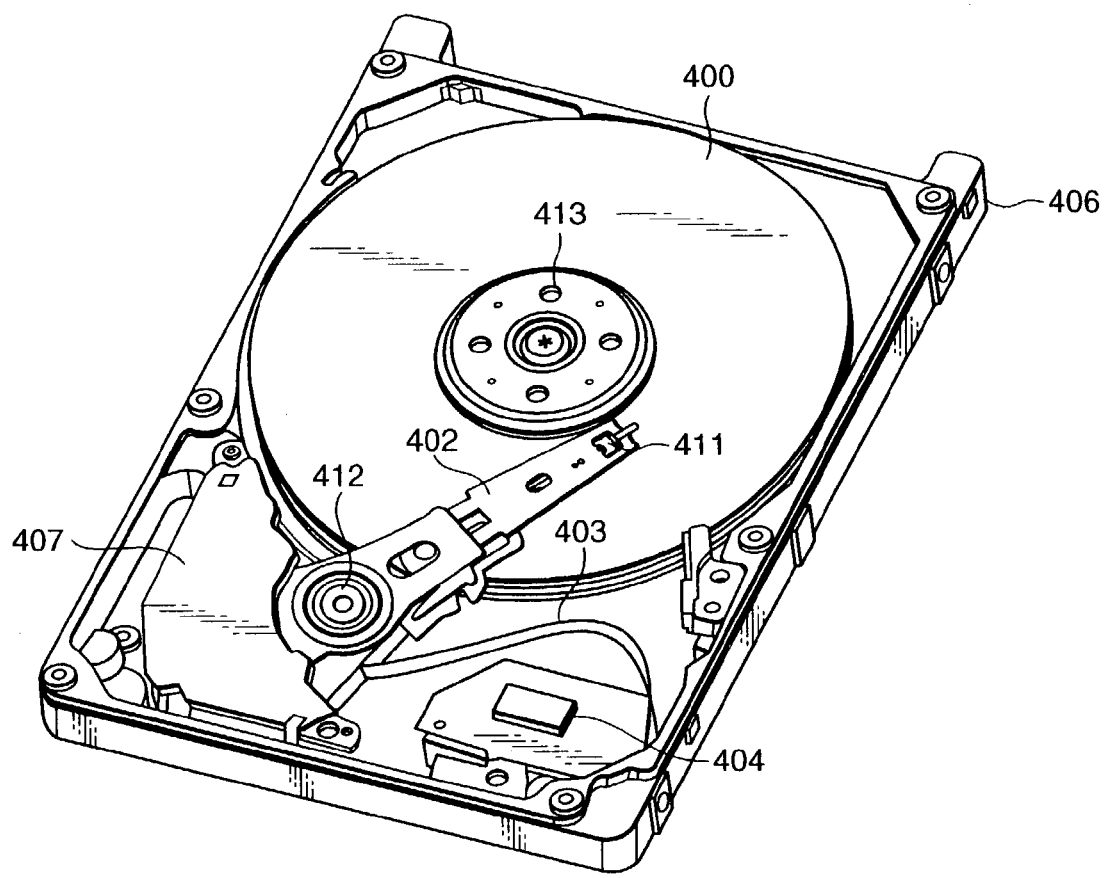
FIG. 6 is a perspective view showing a whole constitution of the magnetic disk drive.

A first embodiment of a magnetic disk drive according to the present invention will be described in detail below with reference to FIGS. 1, 2, 3 and 6. FIG. 1 is a perspective view of a whole construction of an actuator of the first embodiment of a magnetic disk drive according to the present invention. FIG. 2 is a view showing a detailed construction of a configuration of connection between VCM system wires (coil lead wires and a ground wire) and a FPC, in the first embodiment. FIG. 3 is a sectional view taken along a line III—III in FIG. 2. FIG. 6 is a perspective view showing a whole constitution of the magnetic disk drive.

FIG. 6 shows an example of a 2.5-type magnetic disk drive mounted in notebook-sized personal computers. In the magnetic disk drive shown in FIG. 6, a housing 406 and a cover sealingly close an interior of the housing. A spindle motor is fixed to the housing 406. A magnetic disk 400 is fixed to the spindle motor by a clamp 413 with a spacer therebetween. Alternatively, the spindle motor and the magnetic disk 400 may be fixed together by adhesion.

An actuator is provided on the housing 406. A magnetic head 411 for reading/writing information from/into the magnetic disk 400 is mounted on a tip end of a suspension 402 on the actuator. Further, the actuator on which the magnetic head is mounted has freedom in a radial direction of the magnetic disk 400 around a pivot 412. Thereby, a VCM fixed to the housing 406 drives the magnetic head to a predetermined location above a surface of the magnetic disk 400.

A signal from the magnetic head 411 is transferred to a pre-main amplifier IC 404 via a FPC 403 and is subjected to amplification processing by the pre-main amplifier IC 404. The pre-main amplifier IC 404 is connected to a printed circuit board (PCB: not shown in FIG. 6) through a connector (not shown in FIG. 6). Therefore, a signal having been subjected to amplification processing by the pre-main amplifier IC 404 is subjected to signal processing by electronic parts mounted on the PCB to be forwarded outside the magnetic disk drive by an external connector (not shown in FIG. 6). The FPC 403 in the present embodiment is fixed in a state, in which an end thereof on a side of the actuator is directed toward a yoke 407 in a reverse manner to an ordinary one, as described later. Therefore, another end of the FPC on a side of the pre-main amplifier IC 404 is connected in a location not between the pre-main amplifier IC 404 and a short side of the housing 406 but between the pre-main amplifier IC 404 and a long side of the housing 406.

An actuator as shown in FIG. 1 is provided in the housing of the magnetic disk drive according to the present embodiment. A portion of the actuator is composed of a suspension 101. A magnetic head 105 for reading/writing information from/into a magnetic disk, which is a recording medium, is mounted on a tip end of the suspension 101. The actuator has freedom in a radial direction of the magnetic disk around a pivot 102. A VCM provided in the housing is rotated to position the magnetic head 105 in a predetermined location on a surface of the magnetic disk.

That is, the actuator in the magnetic disk drive comprises the magnetic head 105, the suspension 101, a guide arm, and a coil holder 100. The VCM comprises a coil, a magnet, and a yoke in the coil holder 100 (in some cases, a VCM indicate a magnet and a yoke, which are fixed in a magnetic disk drive, in a narrow sense). The lead wire of the coil, and a ground wire for putting the magnetic head in ground potential are arranged at the VCM and the actuator. The lead wire and the ground wire, respectively, are connected to corresponding connection portions of a FPC 104.

Stated elaborately, the coil 103 constitutes a portion of drive means for positioning the magnetic head 105, which is mounted on the tip end of the suspension, in an any position above the magnetic disk. The lead wire from the coil 103 and the ground wire for making the magnetic head 105 and the magnetic disk equal to each other in potential, respectively, are connected to the corresponding connection portions on the FPC 104.

In the present embodiment, the coil holder 100 is molded from a resin material and made integral with the coil 103. As shown in FIG. 2, a slit or a cut groove (hereinafter, generically referred as slit) is formed at a side of the coil holder 100. The FPC 104, or the FPC 104 reinforced with reinforcement plates 106 is inserted into the slit, so that the coil lead wire and the ground wire are electrically connected to the FPC through the end of FPC extended connection substrate 201 and the end of the FPC 202. With such constitution, electrical connection with the FPC 104 can be effected at the actuator for positioning of the magnetic head, concretely, the coil holder without the need of any specific connector.

FIG. 2 is an enlarged view showing an area, in which the coil lead wire and the ground wire, which constitute VCM system wires, are connected to the FPC. As described above, the coil holder 100 made integral with the coil 103 is molded from a resin material. Further, the lead wire 107 extended from the coil 103 is solder-connected to a FPC connection substrate 200 (for example, molded from a resin) installed integrally with the coil holder 100. The ground wire 108 conducted to the magnetic head also in connected to the FPC connection substrate 200.

FIG. 3 shows a detailed structure of the FPC connection substrate 200 and shows an example in which the two coil lead wires 107 and the single ground wire 108 are wired to the FPC connection substrate 200 from a side of the coil holder 100 to constitute connection ends.

The FPC connection substrate 200 is fixed to a surface of the slit of the coil holder 100 so that it can be connected with the connection portion of the FPC. The coil holder 100 is integrally molded with the coil 103 and the FPC connection substrate 200 by a resin. The FPC connection substrate 200 is fixed so that its electric connection portion projects inside the slit. Therefore, the lead wire of the coil 103 and the ground wire can be connected to the corresponding connection portions of the FPC 104 only by inserting the positioned FPC into the slit.

Figure 4:
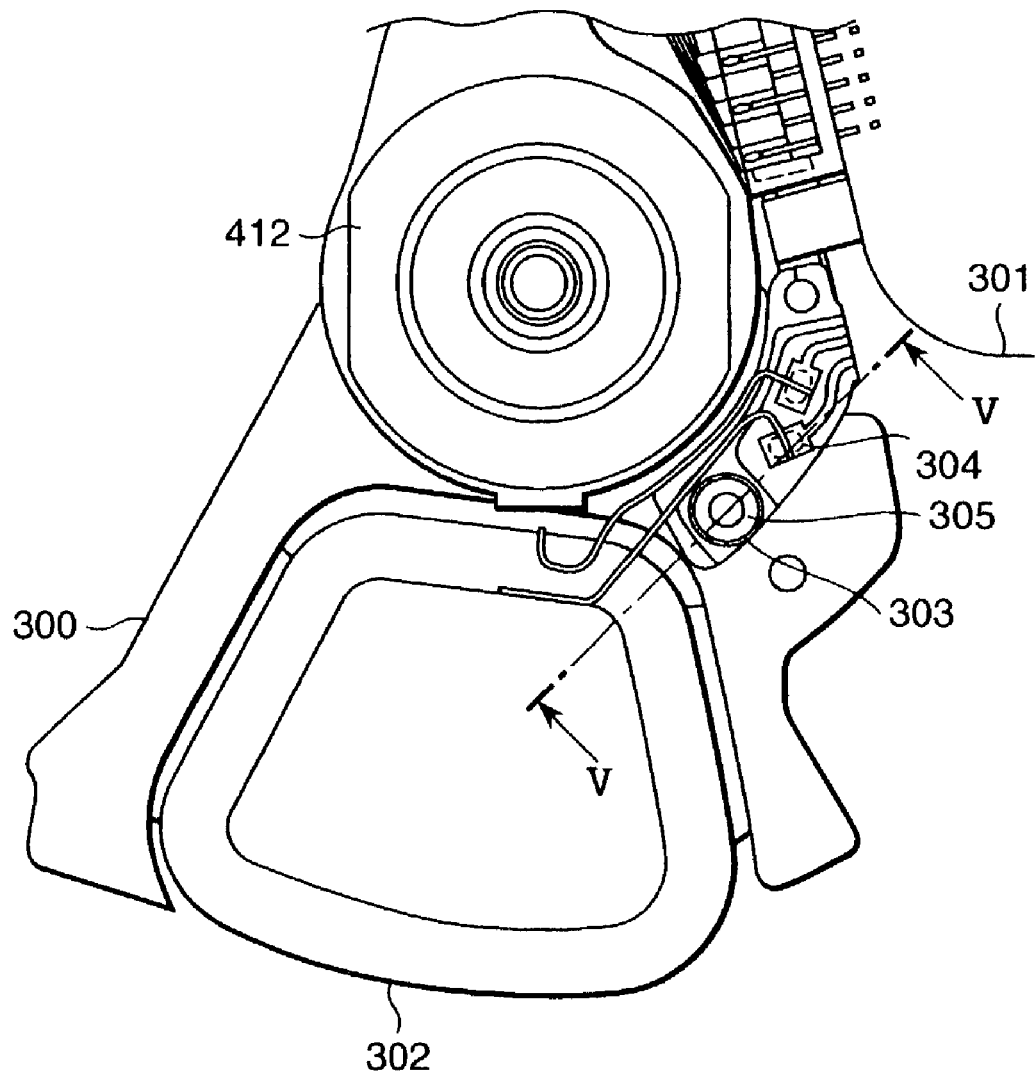
FIG. 4 is a plan view of a coil holder showing a connection manner, in which VCM system wires (coil lead wires and a ground wire) and a FPC are connected to each other in a prior art magnetic disk drive.
Figure 5:
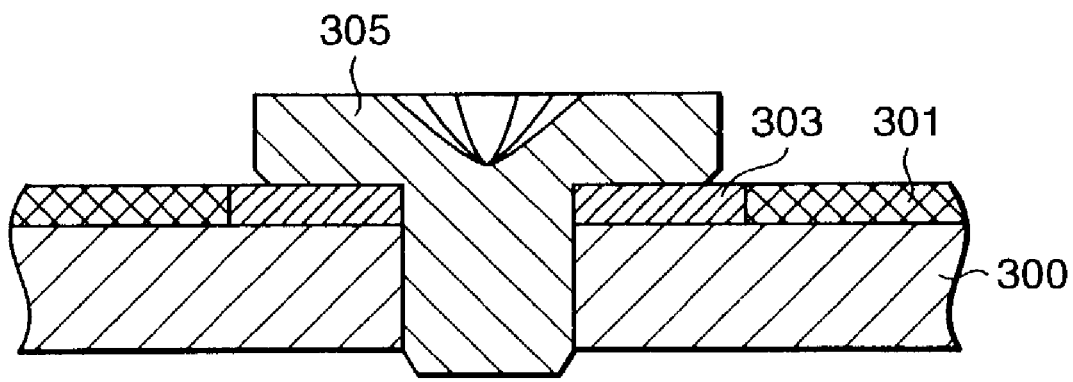
FIG. 5 is an enlarged sectional view taken along a line V—V in FIG. 4.

The connection portion of the FPC 104 comprises a single structure of the FPC 104, or a structure with the FPC 104 stuck to the reinforcement plates 106. The connection portion of the FPC 104 is inserted into the slit, into which the electric connection portion of the FPC connection substrate 200 projects, and is positioned. Here, it is desired that the reinforcement plates 106 be formed from a metallic material in the form of a thin sheet, or a resin material in terms of easiness of insertion and reinforcement of the FPC. As appreciated from FIG. 3, the connection portion of the FPC is within a thickness of the coil holder 100. Therefore, the structure of connection between the VCM system wires and the FPC 104 constitutes no obstacle to making the magnetic disk drive small and thin in size, as compared with the structure of screw and solder connection in the conventional technique shown in FIG. 4.

Further, in order to prevent the FPC 104 inserted into the slit from coming off, a hook is formed on the reinforcement plates 106 or an end of the FPC 202, and an engagement portion (for example, a recess formed in the slit) for latching the hook is formed in the slit. The hook and the engagement portion constitute a stopper 203. According to the stopper 203, it becomes possible to keep the contact without the FPC 104 coming off even when vibrations and shocks are applied on the magnetic disk drive during operation. In FIG. 2, shown is a construction, in which the stopper functions to act in a direction into which the FPC is inserted. Alternatively, a similar stopper composed of a hook and an engagement portion may be provided in a thickness direction of the coil holder 100. The provision of such stopper enables that connection of the FPC, which provides a simple construction and a good workability in assembling and is conformed to miniaturization and thinning, without the need of any specific parts for exclusive use in preventing the FPC from coming off.

A second embodiment of the invention relating to a configuration of connection between VCM system wires (the lead wires 107 extended from the coil and the ground wire 108) will be described with reference to FIGS. 7, 8 and 9. In the constitution of the magnetic disk drive shown in FIG. 6 and the constitution of the actuator shown in FIG. 1, a slit or a cut groove (hereinafter, generically referred as slit) is formed at a side of the coil holder 100.

Figure 7:
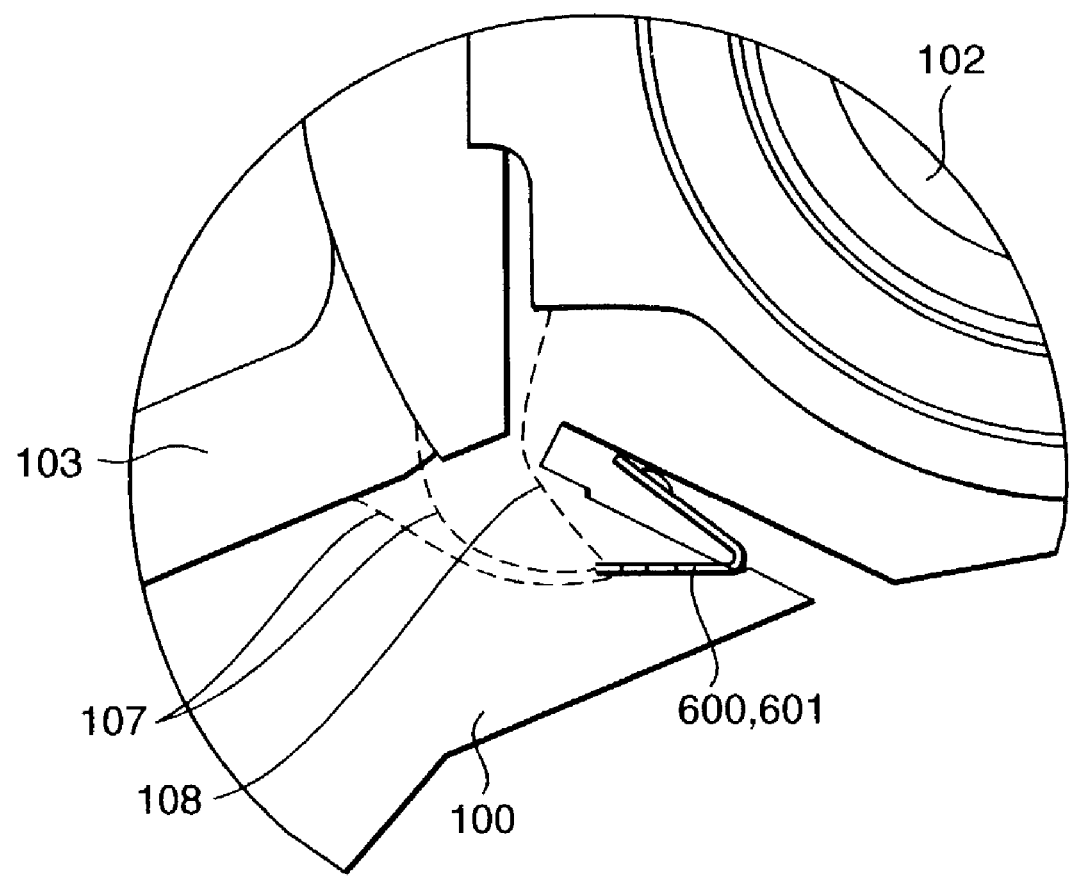
FIG. 7 is an enlarged plan view showing a location on a coil holder, to which a FPC is to be connected, before insertion of the FPC in a second embodiment of the present invention.

FIG. 7 is an enlarged view showing an area, in which lead wires 107 extended from a coil and a ground wire 108, which constitute VCM system wires, are to be connected to the FPC 104, before insertion of the FPC 104. A coil holder 100 made integral with a coil 103 is molded from a resin material. Further, the lead wires 107 extended from the coil 103 are solder-connected to springs 600 for the lead wires (for example, molded from a resin) integrally installed with the coil holder 100. Similarly, the ground wire 108 is solder-connected to a spring 601 for the ground wire.

Figure 8:
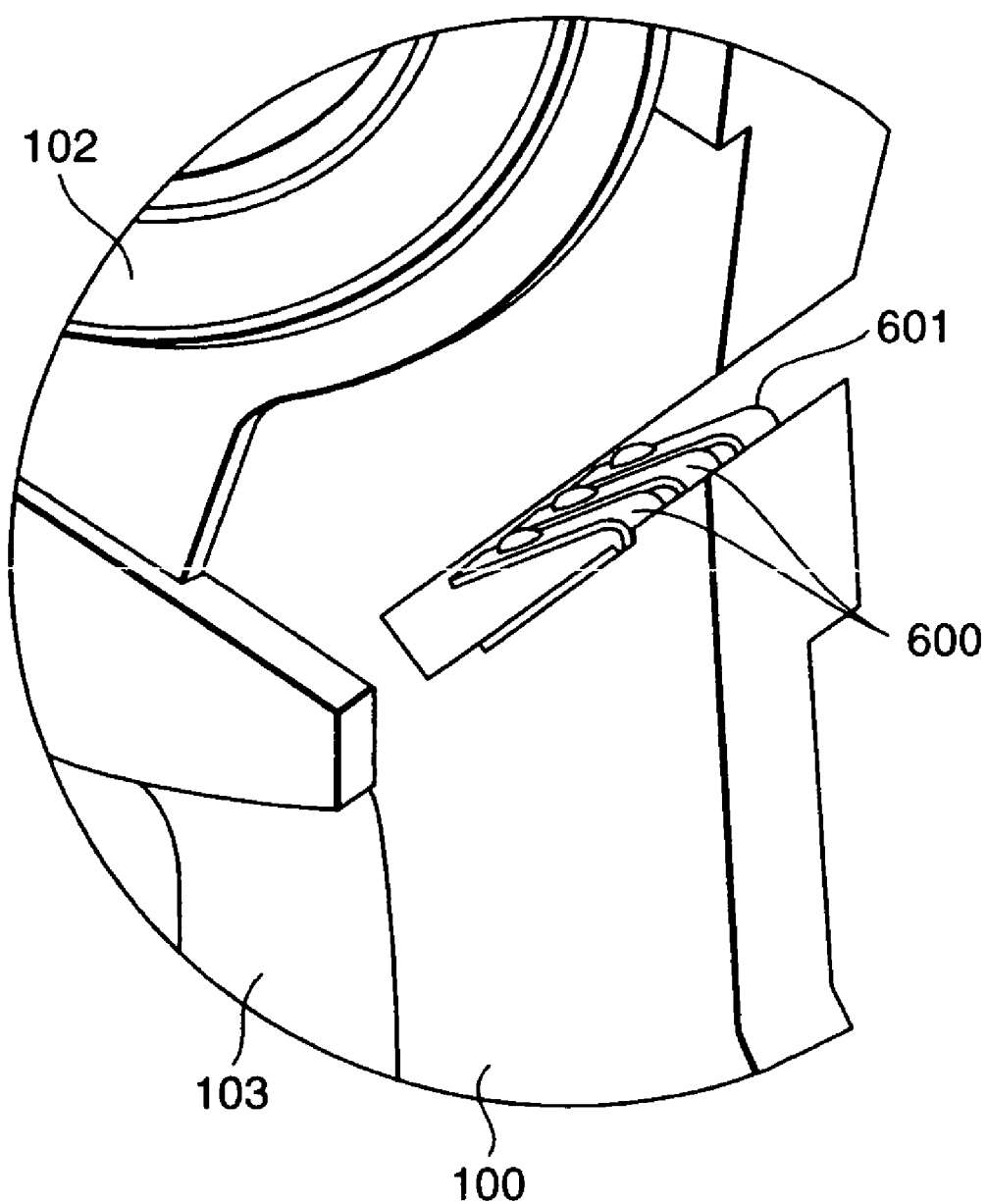
FIG. 8 is an enlarged, perspective view showing the location on the coil holder, to which the FPC is to be connected, in FIG. 7.

FIG. 8 is a perspective view showing an area, in which the springs 600 for the lead wires and the spring 601 for the ground wire are connected to the FPC, before insertion of the FPC 104, and shows an example, in which connection ends of the FPC are constituted. The two springs 600 for the lead wires and the single spring for the ground wire are mounted inside the slit of the coil holder 100 molded from a resin. As apparent from FIG. 8, the respective springs 600, 601 project inside the slit and are fixed in positions, in which crimping connection is positively effected when the FPC 104 is inserted thereinto.

Figure 9:
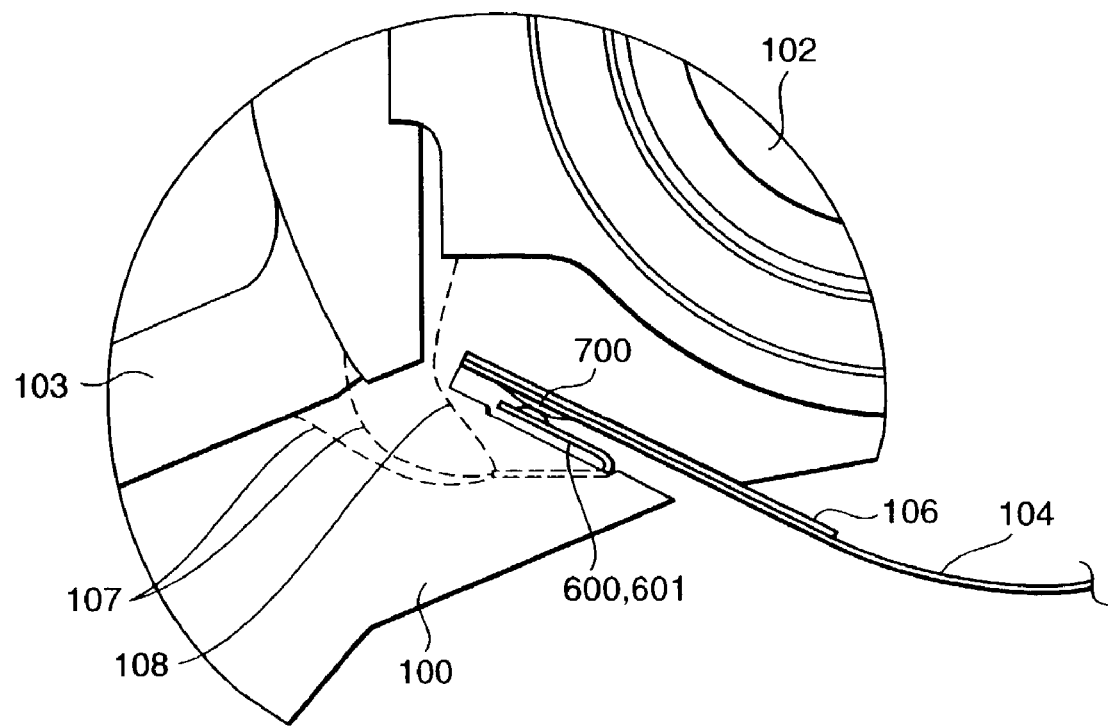
FIG. 9 is an enlarged plan view showing the location on the coil holder, to which the FPC is to be connected, after insertion of the FPC in the second embodiment of the present invention

FIG. 9 is an enlarged view showing the area, in which lead wires 107 extended from the coil and the ground wire 108, which constitute VCM system wires, are to be connected to the FPC 104, after insertion of the FPC 104. The FPC 104, or the FPC 104 reinforced with a reinforcement plate 106 is inserted into the slit of the coil holder 100 shown in FIG. 7, and the lead wires 107 and the ground wire 108 are electrically connected to the FPC 104 at a solder surface 700 through the springs 600 for the lead wires and the spring 601 for the ground wire. With such constitution, electrical connection with the FPC 104 can be effected at the actuator for positioning of the magnetic head, concretely, the coil holder without the need of any specific connector.

In the respective embodiments, the coil 103 is insert-molded integrally with the coil holder 100. Therefore, the coil holder is increased in strength as compared with that structure, in which a coil is fixed to a metallic coil holder by an adhesive. Further, the coil 103 is molded to the coil holder 100 whereby it is possible to ensure freedom in design, by which the slit can be set in an any position.

In the above-description, the magnetic disk drive making use of magnetic disks has been described, but the respective embodiments are not limited thereto. They provide a technology applicable to a disk drive making use of magneto-optic disks and optical disks. Further, in the above-described embodiments, the connecting portion having lead coil wires and the ground wires has been described, but it may comprise only coil lead wires, or necessary wires other than coil lead wires and a ground wire.

In this manner, a screw having been used in a magnetic disk drive is dispensed with, and so it is possible to reduce the number of parts. Further, there is no need of using expensive, small-sized precision screws having been adopted in miniaturization of magnetic disk drives, and therefore, it is possible to realize reduction in cost.

Moreover, in the case where a screw is adopted in achieving miniaturization and thinning of magnetic disk drives, a space accommodating a thickness of the screw mounted on a coil holder becomes difficult to ensure, so that a portion of a VCM yoke opposed to the screw must be shaved. According to the respective embodiments, however, there is no need of shaving a VCM yoke because connection to contacts of a FPC can be effected in a range of a thickness of a coil holder. Therefore, it is possible to improve a capability of a VCM and hence a magnetic disk drive.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A disk drive comprising:
   a medium for recording information;
   a head for reproducing information from the medium;
   an actuator on which the head is mounted;
   a voice coil motor for driving the actuator;
   a coil holder holding a coil of the voice coil motor;
   a flexible printed circuit for transmitting a signal, which is read by the head; and
   a cut groove formed in the coil holder to provide for connection between ends of lead wires of the coil and an end of the flexible printed circuit,
   wherein the cut groove has at least one spring provided therein to provide a crimping connection when the flexible printed circuit is inserted thereinto.

2. A disk drive according to claim 1, wherein said cut groove is formed at a side of the coil holder.

3. A disk drive according to claim 1, wherein said coil holder is molded from a resin material, and the coil is insert-molded into the coil holder.

4. A disk drive according to claim 1, wherein the end of the flexible printed circuit is structured to have a reinforcement plate or plates attached thereto.

5. A disk drive according to claim 4, wherein the reinforcement plate or plates are made of a metallic material or a resin material.

6. A disk drive according to claim 1, wherein said cut groove further provides connection between an end of a ground wire and the end of the flexible printed circuit.

* * * * *